(12) United States Patent
Hu (10) Patent No.: US 11,317,011 B2
(45) Date of Patent: Apr. 26, 2022

(54) TERMINAL DEVICE

(71) Applicant: BEIJING XIAOMI MOBILE SOFTWARE CO., LTD., Beijing (CN)

(72) Inventor: Xiankun Hu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 52 days.

(21) Appl. No.: 16/855,575

(22) Filed: Apr. 22, 2020

(65) Prior Publication Data

US 2021/0168271 A1   Jun. 3, 2021

(30) Foreign Application Priority Data

Nov. 29, 2019   (CN) .......................... 201911204615.5

(51) Int. Cl.
| | |
|---|---|
| *H04N 5/225* | (2006.01) |
| *G02B 13/00* | (2006.01) |
| *G03B 17/12* | (2021.01) |
| *H04M 1/02* | (2006.01) |

(52) U.S. Cl.
CPC ....... *H04N 5/2257* (2013.01); *G02B 13/0065* (2013.01); *G03B 17/12* (2013.01); *H04M 1/0264* (2013.01); *H04M 1/0266* (2013.01); *H04N 5/2253* (2013.01)

(58) Field of Classification Search
CPC ............... H04N 5/2257; H04N 5/2253; G02B 13/0065; G02B 6/0008; G02B 6/4298; G03B 17/12; H04M 1/0264; H04M 1/0266; G06F 1/1626; G06F 1/1686
See application file for complete search history.

(56) References Cited

U.S. PATENT DOCUMENTS

| | | | |
|---|---|---|---|
| 2007/0041723 A1 | 2/2007 | Gutierrez et al. | |
| 2012/0069232 A1* | 3/2012 | Chui | G03B 17/00 |
| | | | 348/333.01 |
| 2019/0243417 A1* | 8/2019 | Cheng | G06F 1/1605 |
| 2019/0286192 A1* | 9/2019 | Cao | G06F 1/1688 |
| 2020/0209470 A1* | 7/2020 | Li | G02B 6/12004 |

FOREIGN PATENT DOCUMENTS

| | | |
|---|---|---|
| CN | 108415514 A | 8/2018 |
| WO | 2017075005 A1 | 5/2017 |

OTHER PUBLICATIONS

Extended European Search Report of counterpart EP Application No. 20176714.2 dated Nov. 18, 2020, (xp).

* cited by examiner

*Primary Examiner* — Mekonnen D Dagnew
(74) *Attorney, Agent, or Firm* — Arch & Lake LLP (57) ABSTRACT

Provided are a terminal device and an apparatus. The terminal device includes: a cover plate having a transparent middle area and an opaque light shielding area at least partially surrounding the middle area, the light shielding area having a light transmitting hole. The terminal device includes a display panel disposed next to the cover plate. The terminal device includes a camera, where a first projection of the camera onto the cover plate is at least partially located within a second projection of the display panel onto the cover plate. The terminal device also includes a light transmitting element having a first and second ends, where the first end is connected to a lens of the camera, and the second end is opposite to the light transmitting hole. The light transmitting element is configured to transmit light from an external object to the lens of the camera.

20 Claims, 5 Drawing Sheets

TERMINAL DEVICE

CROSS-REFERENCE TO RELATED APPLICATION

The present application claims priority to Chinese Patent Application No. 201911204615.5 filed on Nov. 29, 2019, the disclosure of which is hereby incorporated by reference in its entirety.

TECHNICAL FIELD

The present disclosure relates to the technical field of mobile terminals, and in particular, to a terminal device.

BACKGROUND

In order to increase a screen-to-body ratio, i.e., a ratio of the area of a display region to the area of the entire front panel of the terminal device, in a terminal device, a front camera is often placed below a display panel to reduce the area occupied by the front camera.

SUMMARY

In one aspect of present disclosure, a terminal device which is an electronic device is provided. The terminal device includes: a cover plate having a transparent middle area and an opaque light shielding area at least partially surrounding the middle area, the light shielding area having a light transmitting hole. The terminal device also includes a display panel disposed next to the cover plate. The terminal device includes a camera, where a first projection of the camera onto the cover plate is at least partially located within a second projection of the display panel onto the cover plate. The terminal device also includes a light transmitting element, where one end of the light transmitting element is connected to a lens of the camera, and the other end of the light transmitting element is opposite to the light transmitting hole. The light transmitting element is configured to transmit light from an external object to the lens of the camera.

In a second aspect of present disclosure, an apparatus is provided. The apparatus device includes: a cover plate having a transparent middle area and an opaque light shielding area at least partially surrounding the middle area, the light shielding area having a light transmitting hole. The apparatus device includes a display panel disposed next to the cover plate. The apparatus device includes a sensor, where a first projection of the sensor onto the cover plate is at least partially located within a second projection of the display panel onto the cover plate. The apparatus device also includes a light transmitting element, where one end of the light transmitting element is connected to the sensor, and the other end of the light transmitting element is connected to the light transmitting hole. The light transmitting element is configured to transmit external light to the lens of the sensor.

BRIEF DESCRIPTION OF THE DRAWINGS

In order to describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

Some embodiments of the present disclosure will be described in further detail with reference to the accompanying drawings, to present the objects, technical solutions, and advantages of the present disclosure more clearly.

Some embodiments of the present disclosure provide a terminal device. The terminal device may be an electronic device with a front camera function, such as a mobile phone, a tablet computer, a television, a laptop computer, a digital photo frame, and the like. The front camera function refers to a function of enabling the capture of an image for an object in front (that is, the orientation of the front side) of the front side (that is, the side where the display screen is located) of the terminal device.

In the related art, in order to place the front camera below the display panel without occupying the screen area of the terminal device, one way is to improve the display panel so that the display panel may have a transparent area which opposite the front camera, and thus light can pass through the display panel and reach a lens of the front camera. Another way is to use a mechanical structure to lift the front camera up and down. The front camera can be exposed when it is needed. When the front camera is not needed, it can be hidden inside the terminal device.

However, the improvement on the display panel makes the structure and manufacturing process of the display panel complicated, and increases the cost of the terminal device. When adopting a mechanical structure to lift the front camera, the position of lifting is prone to dust accumulation, and will also increase the cost of the terminal device.

In the present disclosure, by providing a light transmitting element in the terminal device and arranging one end of the light transmitting element to be connected to the lens of the camera and the other end thereof to be opposite to the light transmitting hole of the cover plate, the light from an external object can be transmitted, by the light transmitting element, to the lens of the camera so as to complete the light path design of the front camera. Meanwhile, the display panel is parallel to the cover plate, and an orthographic projection of the camera onto the cover plate is located within an orthographic projection of the display panel onto the cover plate, that is, the camera is located below the display panel, as such, the display panel can be used to shield the camera and there is no need to dispose a light shielding area on the cover to shield the camera, thereby reducing the area of the light shielding area and increasing the screen-to-body ratio of the terminal device.

Figure 1:
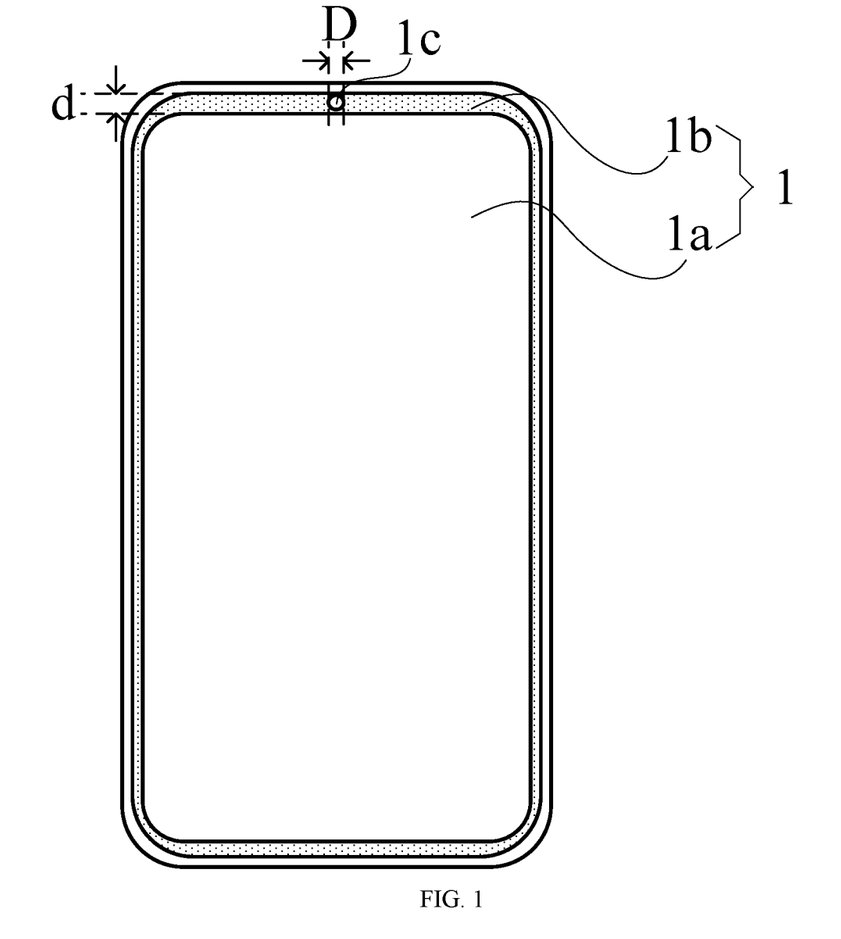
FIG. 1 is a schematic front view structural diagram of a terminal device according to an embodiment of the present disclosure.

FIG. 1 is a schematic front view structural diagram of an apparatus, which may be a terminal device according to an embodiment of the present disclosure. As shown in FIG. 1, the terminal device includes a cover plate 1. The cover plate 1 has a transparent middle area 1a and an opaque light shielding area 1b surrounding the middle area 1a. The light shielding area 1b has a light transmitting hole 1c.

Figure 2:
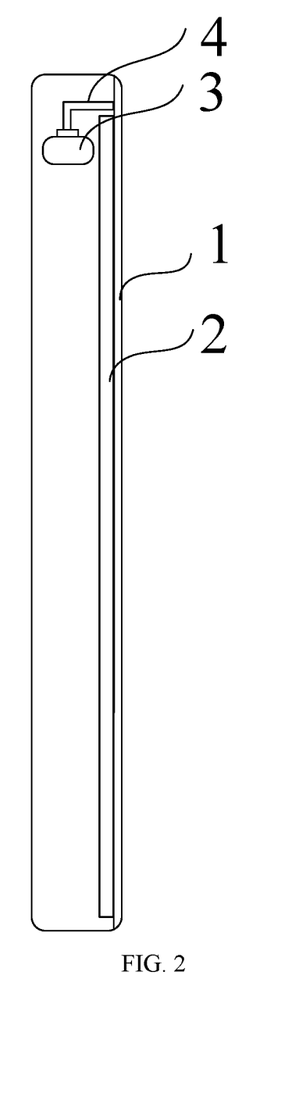
FIG. 2 is a schematic cross-sectional structural diagram of a terminal device according to an embodiment of the present disclosure.
Figure 3:
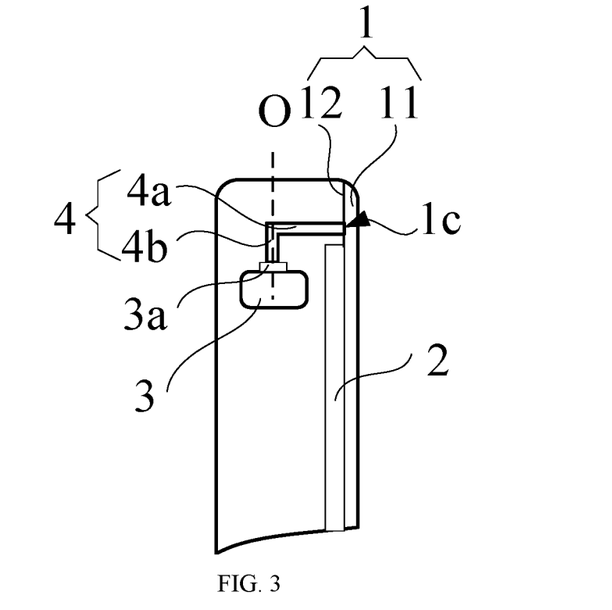
FIG. 3 is a schematic partially enlarged structural diagram of the terminal device shown in FIG. 2.

FIG. 2 is a schematic structural diagram of a terminal device according to an embodiment of the present disclosure. FIG. 3 is a schematic partially enlarged structural diagram of the terminal device shown in FIG. 2. As shown in FIG. 2 and FIG. 3, the terminal device further includes a display panel 2, a sensor such as a camera 3, and a light transmitting element 4. The display panel 2 is disposed next to the cover plate 1. In one example, the display panel 2 is parallel to the cover plate 1.

A first projection of the camera 3 onto the cover plate 1 is at least partially located within a second projection of the display panel 2 onto the cover plate 1. In one example, an orthographic projection of the camera 3 onto the cover plate 1 is located within an orthographic projection of the display panel 2 onto the cover plate 1. One end of the light transmitting element 4 is connected to a lens 3a of the camera 3. The other end of the light transmitting element 4 is opposite to the light transmitting hole 1c. In one or more embodiments, the other end of the light transmitting element 4 is connected to the light transmitting hole 1c. The light transmitting element 4 is configured to transmit light from an external object to the lens 3a of the camera 3. In other words, the light transmitting element 4 is configured to transmit external light to the lens 3a of the camera 3.

By providing a light transmitting element in the terminal device and arranging one end of the light transmitting element to be connected to the lens of the camera and the other end thereof to be opposite to the light transmitting hole of the cover plate, the light from an external object can be transmitted, by the light transmitting element, to the lens of the camera so as to complete the light path design of the front camera. Meanwhile, the display panel is disposed next to the cover plate, and an orthographic projection of the camera onto the cover plate is located within an orthographic projection of the display panel onto the cover plate, that is, the camera is located below the display panel, as such, the display panel can be used to shield the camera and there is no need to dispose a light shielding area on the cover to shield the camera, thereby reducing the area of the light shielding area and increasing the screen-to-body ratio of the terminal device.

For example, the display panel 2 is parallel to the cover plate 1, so that the display area of the display panel 2 is disposed opposite to the middle area 1a of the cover plate 1. That is, the orthographic projection of the display area of the display panel 2 onto the cover plate 1 is located in the middle area 1a. Thus, the picture displayed on the display panel 2 can be viewed by a user through the cover plate.

Exemplarily, the cover plate 1 may include a transparent plate 11 and a light shielding layer 12. The light shielding layer 12 is located at an edge area of the transparent plate 11 to form the light shielding area 1b, and a middle area 1a is surrounded by the light shielding layer 12. An opening, i.e., the light transmitting hole 1c, is located in the light shielding layer 12.

The shape of the light shielding area 1b matches the shape of the cover plate 1. For example, as shown in FIG. 1, the cover plate 1 is a rectangular cover plate, and accordingly, the light shielding area 1b has a rectangular ring shape.

Exemplarily, the light transmitting hole 1c is generally located at the top portion of the mobile terminal. The top portion of the mobile terminal refers to an upper portion when the display screen of the mobile terminal is placed vertically. The position of the light transmitting hole 1c can be adjusted according to actual needs.

Alternatively or additionally, the transparent plate 11 may be a glass plate or a plastic plate. Optionally, the light shielding layer 12 may be an ink layer. The ink layer may be formed on the transparent plate by screen printing.

Alternatively or additionally, referring to FIG. 1 again, the maximum inner diameter of the light transmitting hole 1c may be less than or equal to 2 mm, such as between 1 mm to 2 mm. When the maximum inner diameter of the light transmitting hole is small, the width d of the light shielding area is small, which is beneficial for the improvement of the screen-to-body ratio.

Exemplarily, the light transmitting hole 1c is a circular hole, and the diameter D of the light transmitting hole 1c may be between 1 mm to 2 mm. It should be noted that the shape of the light transmitting hole 1c can be set according to actual needs.

Alternatively or additionally, the display panel 2 may be an organic light emitting diode display panel or a liquid crystal display panel, which is not limited in the present disclosure.

Alternatively or additionally, the light transmitting element 4 is configured to transmit, based on the total reflection principle, light from an external object to the lens 3a of the camera 3. The transmission of light from an external object to the lens 3a of the camera 3 based on total reflection facilitates the lossless transmission of the image. In an example, the light transmitting element 4 may include an optical fiber. It should be noted that, in some embodiments of the present disclosure, the light transmitting element 4 may also be implemented by using other optical components such as optical prism, so long as the light from an external object can be transmitted to the lens 3a of the camera 3. Optical fiber is taken as an example in the following.

The optical fiber includes a vertical section 4a perpendicular to the cover plate 1 and a bent section 4b connected to the vertical section 4a at an angle. By bending the optical fiber, the camera can be conveniently placed at any desired position at the back of the display panel 1. In addition, because the fiber is only bent once, the transmission performance will not be affected. It should be noted that, in other embodiments, the number of times the optical fiber is bent may be set according to actual needs, which is not limited in the present disclosure.

Exemplarily, an included angle between the vertical section 4a and the bent section 4b may be 90 degrees. That is, the bent section 4b may be parallel to the display panel 1. In this way, an optical axis direction O of the lens 3a of the camera 3 can be set to be parallel to the cover plate 1 to facilitate the arrangement of the camera 3.

Alternatively or additionally, two ends of the light transmitting element 4 may be adhered to the cover plate 1 and the lens 3a of the camera 3 through optical glue, respectively. In this way, the optical fiber can be fixed and will not move during use, and thus the transmission of light will not be badly influenced.

Figure 4:
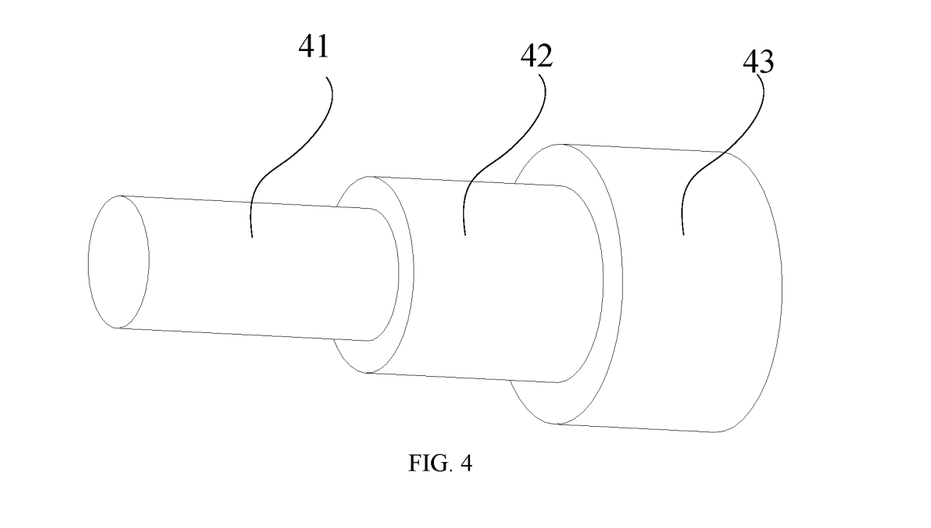
FIG. 4 is a schematic structural diagram of an optical fiber according to an embodiment of the present disclosure.

FIG. 4 is a schematic structural diagram of an optical fiber according to an embodiment of the present disclosure. As shown in FIG. 4, the optical fiber includes a core 41, and a cladding 42 and a protective sleeve 43 which are sequentially sleeved outside the core 41.

Alternatively or additionally, in some embodiments of the present disclosure, the optical fiber may be a glass optical fiber or a plastic optical fiber. That is, the core 41 may be made of glass or plastic. The cladding 42 may be a glass coating. The cladding 42 causes light to be retained inside the core 41. The protective sleeve 43 may be a plastic sleeve for protecting the cladding 42.

The refractive index of the core 41 is greater than the refractive index of the cladding 42 so that when the incident light satisfies a certain condition, total reflection can occur at an interface between the core 41 and the cladding 42 and then total reflection propagation can be realized in the optical fiber.

Total reflection is an optical phenomenon. When light enters from a medium having a higher refractive index to a medium having a lower refractive index, if the incident angle is greater than the critical angle of total reflection, the refracted light will disappear, and all incident light will be reflected without entering the medium having a low refractive index.

Figure 5:
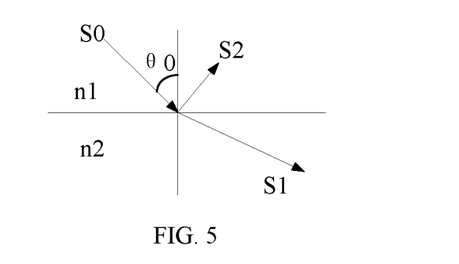
FIG. 5 shows principle of total reflection of light when the incident angle θ0 is smaller than the critical angle.
Figure 6:
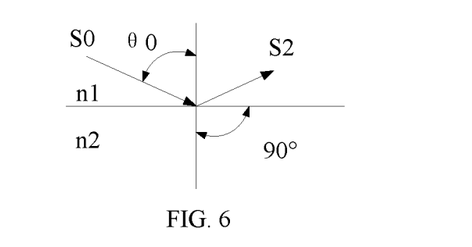
FIG. 6 shows principle of total reflection of light when the incident angle θ0 is equal to the critical angle.
Figure 7:
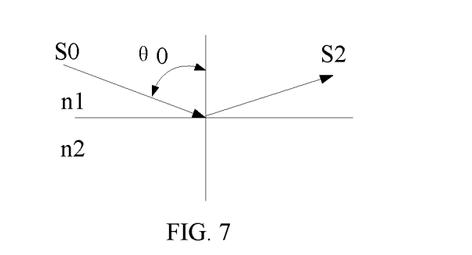
FIG. 7 shows the principle of total reflection of light when the incident angle θ0 is greater than the critical angle.

FIG. 5 to FIG. 7 show the principle of total reflection of light. In FIG. 5 to FIG. 7, the refractive index of an upper medium is n1, and the refractive index of a lower medium is n2, n1>n2. For ease of description, the upper medium is referred to as an n1 medium and the lower medium is referred to as an n2 medium.

As shown in FIG. 5, when the incident angle θ0 is smaller than the critical angle, the light rays S0 simultaneously undergo refraction S1 into the n2 medium and reflection S2 into the n1 medium. As shown in FIG. 6, when the incident angle θ0 is equal to the critical angle, the light rays S0 undergo refraction (not shown) into the n2 medium and reflection S2 into the n1 medium at the same time, and the refraction angle is 90°. As shown in FIG. 7, when the incident angle θ0 is greater than the critical angle, the light rays refracted into the n2 medium disappear, and all the light rays S2 are reflected into the n1 medium.

The lens 31 of the camera 3 has a field of view (FOV) which is used to indicate the field range of view of the lens 31. In order to prevent the total reflection angle range of the optical fiber from affecting the FOV of the lens 31 of the camera 3, through selection on the core and cladding materials with suitable refractive indexes, the angle range of the incident light that can be totally reflected in the optical fiber can be set as equal to the FOV.

Figure 8:
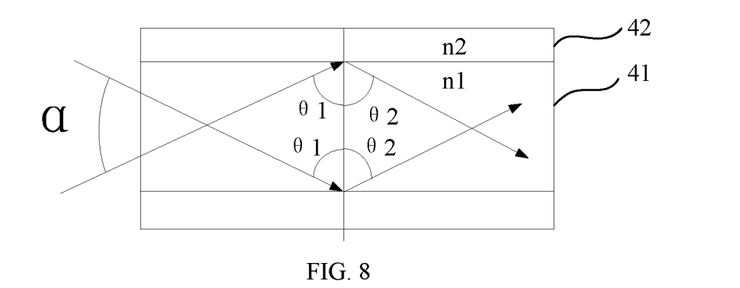
FIG. 8 is a schematic diagram showing a relationship between a field of view (FOV) of a lens of a camera and a critical angle of total reflection of a light transmitting element.

FIG. 8 is a schematic diagram showing a relationship between a FOV of a lens of a camera and a critical angle of total reflection of a light transmitting element. As shown in FIG. 8, formula (1) can be derived from the geometric relationship:

$$\alpha = 180° - 2*\theta 1 \quad (1),$$

where θ1=θ2=θc, θ1 is the angle of incident light, θ2 is the angle of reflected light, and θc is the critical angle of total reflection.

Therefore, by controlling the total reflection critical angle θc of the optical fiber, the angle range of the incident light that can be totally reflected in the optical fiber can be accordingly controlled. That is, the total reflection critical angle θc of the optical fiber may be equal to one-half of the complement angle of the FOV α of the lens 3a of the camera 3.

It can be known from the refractive index formula that $$\sin(\theta 1) = \sin(\theta 2) = n1/n2 \quad (2),$$

where n1 is the refractive index of the core, n2 is the refractive index of the cladding, and the sine of the total reflection critical angle θc is equal to the ratio of the refractive index of the core 41 to the refractive index of the cladding 42. It can be seen that the critical angle of total reflection can be set by controlling the refractive indexes of the cladding and the core.

Figure 9:
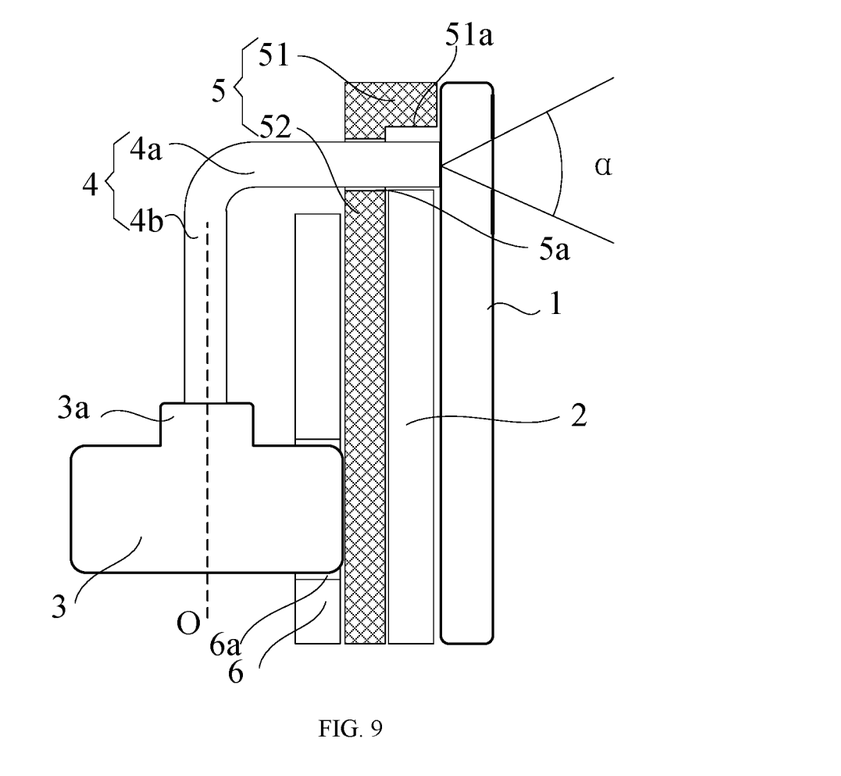
FIG. 9 is a schematic partial cross-sectional structural diagram of a terminal device according to an embodiment of the present disclosure.

FIG. 9 is a schematic partial cross-sectional structural diagram of a terminal device according to an embodiment of the present disclosure. Referring to FIG. 9 which shows a structure different from the structure shown in FIG. 2. In FIG. 9, the terminal device further includes a middle frame 5, the cover plate 1 and the camera 3 are separately located on two sides of the middle frame 5, the middle frame 5 has a mounting hole 5a, and the light transmitting element 4 passes through the mounting hole 5a.

By providing the mounting hole 5a in the middle frame 5, the position of the light transmitting element 4 can be further restricted, and the stability of the structure can be improved.

As an example, as shown in FIG. 9, the middle frame 5 may include a support frame 51 and a bottom plate 52. The mounting hole 5a is located in the bottom plate 52 and is close to an inner side wall 51a of the support frame 51. The inner side wall 51a refers to a side wall of the support frame 51 surrounding the display panel 2 and opposite to the display panel 2.

In some embodiments, the display panel 2 may be fixedly connected to the cover plate 1, such as by glue bonding, and the cover plate 1 is fixedly connected to the middle frame 5 (for example, to the supporting surface of the support frame 51), thereby fixing the display panel 2 on the middle frame 5.

The shape of the support frame 51 matches the shape of the cover plate 1. For example, when the cover plate 1 is rectangular, the support frame 51 may be a rectangular frame. When the cover plate 1 is circular, the support frame 51 may be a circular frame.

Alternatively or additionally, the terminal device may further include a motherboard 6 located on the middle frame 5 and electrically connected to the camera 3. The motherboard 6 can be configured to receive images collected by the camera 3 and control the actions of the camera 3.

Alternatively or additionally, the motherboard 6 and the camera 3 may be located on the same side of the middle frame 5, so that the internal structure of the mobile terminal can be compact, which is beneficial to the reduction of the thickness of the mobile terminal.

When the motherboard 6 and the camera 3 are located on the same side of the middle frame 5, interference may occur between the motherboard 6 and the camera 3 in some cases, for example, when the motherboard 6 is large, or the positions of the motherboard 6 and the camera 3 conflict. In these cases, the motherboard 6 may be provided a camera avoidance hole 6a. As such, the camera 3 can be arranged in the camera avoidance hole 6a and fixedly connected to the middle frame 5, so that the thickness of the terminal device can be reduced.

In some other embodiments, the motherboard 6 and the camera 3 do not interfere, and thus there is no need to dispose a camera avoidance hole 6a, and the camera 3 can be directly installed on the middle frame 5.

Exemplarily, the camera 3 and the middle frame 5 may be connected in a manner including, without limitations, bonding, bolting connection or the like.

In some embodiments of the present disclosure, a terminal device which is an electronic device is provided. The terminal device includes:

a cover plate having a transparent middle area and an opaque light shielding area surrounding the middle area, the light shielding area having a light transmitting hole;

a display panel parallel to the cover plate;

a camera, an orthographic projection of the camera onto the cover plate being located within an orthographic projection of the display panel onto the cover plate; and a light transmitting element, one end of the light transmitting element being connected to a lens of the camera, and the other end of the light transmitting element being opposite to the light transmitting hole, and the light transmitting element being configured to transmit an external image to the lens of the camera.

In a possible implementation, the light transmitting element includes an optical fiber, and the optical fiber includes a vertical section perpendicular to the cover plate and a bent section connected to the vertical section at an angle.

In a possible implementation, an optical axis direction of the lens of the camera is parallel to the cover plate.

In a possible implementation, two ends of the light transmitting element are bonded to the cover plate and the lens of the camera respectively through an optical glue.

In a possible implementation, the light transmitting element is configured to transmit an external image to the lens of the camera based on total reflection, and a critical angle of total reflection of the light transmitting element is equal to one-half of a complement angle of a field of view of the lens of the camera.

In a possible implementation, the light transmitting element includes an optical fiber, the optical fiber includes a core, and a cladding and a protective sleeve sequentially sleeved outside the core, and a sine value of the critical angle of total reflection is equal to a ratio of a refractive index of the core to a refractive index of the cladding.

In a possible implementation, the terminal device further includes a middle frame, wherein the cover plate and the camera are separately located at two sides of the middle frame, the middle frame has a mounting hole, and the light transmitting element passes through the mounting hole.

In a possible implementation, the terminal device further includes a motherboard, wherein the motherboard is electrically connected to the camera, and the motherboard is located on the middle frame.

In a possible implementation, the motherboard and the camera are located on a same side of the middle frame, the motherboard has a camera avoidance hole, and the camera is located in the camera avoidance hole.

In a possible implementation, the maximum inner diameter of the light transmitting hole is less than or equal to 2 mm.

In the present disclosure, by providing a light transmitting element in the terminal device and arranging one end of the light transmitting element to be connected to the lens of the camera and the other end thereof to be opposite to the light transmitting hole of the cover plate, the external image can be transmitted, by the light transmitting element, to the lens of the camera so as to complete the light path design of the front camera. Meanwhile, the display panel is parallel to the cover plate, and an orthographic projection of the camera onto the cover plate is located within an orthographic projection of the display panel onto the cover plate, that is, the camera is located below the display panel, as such, the display panel can be used to shield the camera and there is no need to dispose a light shielding area on the cover to shield the camera, thereby reducing the area of the light shielding area and increasing the screen-to-body ratio of the terminal device.

Other embodiments of the present disclosure will be apparent to those skilled in the art based on the specification and practice disclosed in the present disclosure. The present application is intended to cover any variations, uses, or adaptations of the present disclosure following the general principles thereof and including common knowledge or commonly used technical means which are not disclosed herein. The specification and embodiments are to be considered as exemplary only, with a true scope and spirit of the present disclosure being indicated by the appended claims.

It will be appreciated that the present disclosure is not limited to the specific constructions that have been described above and illustrated in the accompanying drawings, and that various modifications and changes can be made without departing from the scope thereof. It is intended that the scope of the present disclosure only be limited by the appended claims.

What is claimed is:

1. A terminal device, comprising:
    a cover plate having a transparent middle area and an opaque light shielding area at least partially surrounding the middle area, the light shielding area having a light transmitting hole;
    a display panel disposed next to the cover plate;
    a camera having a lens, wherein the camera is disposed on a side of the display panel away from the cover plate; and
    a light transmitting element comprising a first end and a second end, the first end of the light transmitting element being connected to the lens of the camera, and the second end of the light transmitting element being opposite to the light transmitting hole, and the light transmitting element being configured to transmit light received through the light transmitting hole to the lens of the camera.

2. The terminal device according to claim 1, wherein the light transmitting element comprises an optical fiber, and the optical fiber comprises a vertical section perpendicular to the cover plate and a bent section connected to the vertical section at an angle.

3. The terminal device according to claim 1, wherein an optical axis direction of the lens of the camera is parallel to the cover plate.

4. The terminal device according to claim 1, wherein the first and second ends of the light transmitting element are bonded to the cover plate and the lens of the camera respectively through an optical glue.

5. The terminal device according to claim 1, wherein the light transmitting element is configured to transmit the light from the external object to the lens of the camera based on total reflection, and a critical angle of total reflection of the light transmitting element is equal to one-half of a complement angle of a field of view of the lens of the camera.

6. The terminal device according to claim 5, wherein the light transmitting element comprises an optical fiber, the optical fiber comprises a core and a cladding sleeved outside the core, and a sine value of the critical angle of total reflection is equal to a ratio of a refractive index of the core to a refractive index of the cladding.

7. The terminal device according to claim 1, further comprising a middle frame, wherein the cover plate and the camera are located at two sides of the middle frame separately, the middle frame has a mounting hole, and the light transmitting element passes through the mounting hole.

8. The terminal device according to claim 7, further comprising a motherboard, wherein the motherboard is electrically connected to the camera, and the motherboard is located on the middle frame.

9. The terminal device according to claim 8, wherein the motherboard and the camera are located on a same side of the middle frame, the motherboard has a camera avoidance hole, and the camera is located in the camera avoidance hole.

10. The terminal device according to claim 1, wherein an inner diameter of the light transmitting hole is less than or equal to 2 mm.

11. An apparatus, comprising:
  a cover plate having a transparent middle area and an opaque light shielding area at least partially surrounding the middle area, the light shielding area having a light transmitting hole;
  a display panel disposed next to the cover plate;
  a sensor having a lens, wherein the sensor is disposed on a side of the display panel away from the cover plate; and
  a light transmitting element comprising a first end and a second end, the first end of the light transmitting element being connected to the sensor, and the second end of the light transmitting element being connected to the light transmitting hole, and the light transmitting element being configured to transmit external light received through the light transmitting hole to the lens of the sensor.

12. The apparatus according to claim 11, wherein the light transmitting element comprises an optical fiber, and the optical fiber comprises a vertical section perpendicular to the cover plate and a bent section connected to the vertical section at an angle.

13. The apparatus according to claim 11, wherein an optical axis direction of the lens of the sensor is parallel to the cover plate.

14. The apparatus according to claim 11, wherein the first and second ends of the light transmitting element are bonded to the cover plate and the lens of the sensor respectively through an optical glue.

15. The apparatus according to claim 11, wherein the light transmitting element is configured to transmit the light from the external object to the lens of the sensor based on total reflection, and a critical angle of total reflection of the light transmitting element is equal to one-half of a complement angle of a field of view of the lens of the sensor.

16. The apparatus according to claim 15, wherein the light transmitting element comprises an optical fiber, the optical fiber comprises a core and a cladding sleeved outside the core, and a sine value of the critical angle of total reflection is equal to a ratio of a refractive index of the core to a refractive index of the cladding.

17. The apparatus according to claim 11, further comprising a middle frame, wherein the cover plate and the sensor are located at two sides of the middle frame separately, the middle frame has a mounting hole, and the light transmitting element passes through the mounting hole.

18. The apparatus according to claim 17, further comprising a motherboard, wherein the motherboard is electrically connected to the sensor, and the motherboard is located on the middle frame.

19. The apparatus according to claim 18, wherein the motherboard and the sensor are located on a same side of the middle frame, the motherboard has a sensor avoidance hole, and the sensor is located in the sensor avoidance hole.

20. The apparatus according to claim 11, wherein an inner diameter of the light transmitting hole is less than or equal to 2 mm.

* * * * *